(12) United States Patent
Iakossavas

(10) Patent No.: US 7,790,213 B2
(45) Date of Patent: Sep. 7, 2010

(54) PIZZA PAN AND METHOD OF USING SAME

(76) Inventor: George Iakossavas, 4 Spring Town Rd., Woodbridge, Ontario (CA) L4I 8G2

( * ) Notice: Subject to any disclaimer, the term of this patent is extended or adjusted under 35 U.S.C. 154(b) by 1383 days.

(21) Appl. No.: 11/104,466

(22) Filed: Apr. 13, 2005

(65) Prior Publication Data
US 2006/0230949 A1 Oct. 19, 2006

(51) Int. Cl.
*A21D 6/00* (2006.01)
(52) U.S. Cl. ..................... 426/496; 426/502
(58) Field of Classification Search ............... 426/503, 426/496
See application file for complete search history.

(56) References Cited

U.S. PATENT DOCUMENTS

| 4,367,243 | A | * | 1/1983 | Brummett et al. | ........... | 426/303 |
| 5,351,608 | A | * | 10/1994 | Muchin et al. | ............... | 99/422 |
| 5,405,627 | A | * | 4/1995 | Ito | ............... | 426/94 |
| 6,187,359 | B1 | * | 2/2001 | Zuccarini | ............... | 426/505 |
| 7,219,663 | B2 | * | 5/2007 | Cuomo | ............... | 126/25 R |

* cited by examiner

*Primary Examiner*—Keith D Hendricks
*Assistant Examiner*—Jyoti Chawla
(74) *Attorney, Agent, or Firm*—Elias Borges

(57) ABSTRACT

The present invention is a pan for cooking pizza dough and method of using same. The pan consists of a first pan mountable below a second pan. The first pan has a flat bottom and a plurality of fingers projecting upwards from the bottom. The second pan having a flat bottom provided with a plurality of apertures dimensioned and configured to receive the fingers of the first pan. The first and second pans have mounting elements for releasably mounting the second pan on top of the first pan. The apertures of the second pan and the fingers of the first pan are dimensioned and arranged such that the fingers of the first pan project through the apertures of the second pan when the second pan is mounted on top of the first pan. The pans can be used to cook pizza dough by first spreading the pizza dough into the second pan and then mounting the second pan to the first pan such that the fingers of the first pan project through the apertures of the second pan and into the pizza dough. The pizza dough can then be cooked by placing the pans and pizza dough in an oven.

4 Claims, 4 Drawing Sheets

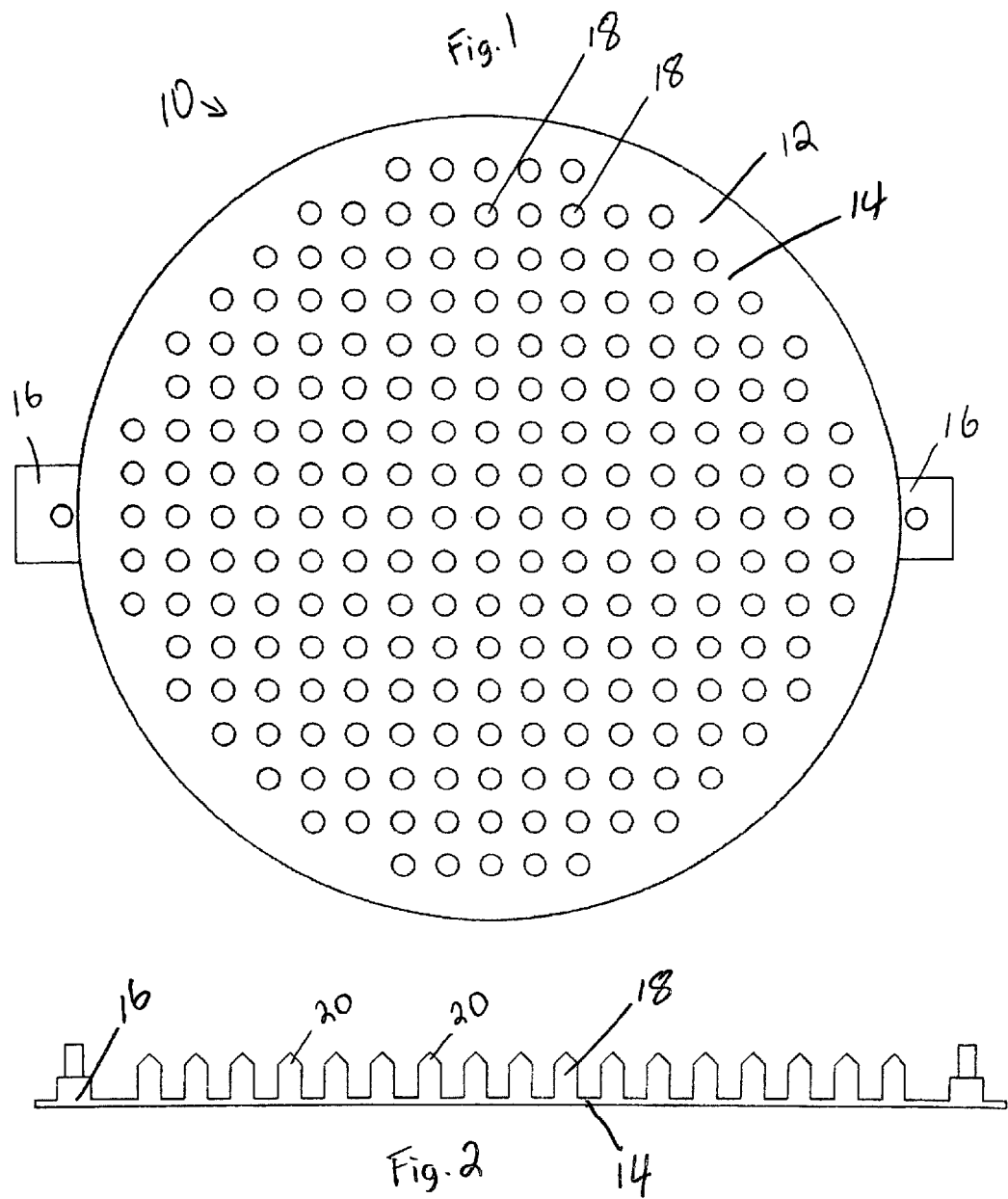

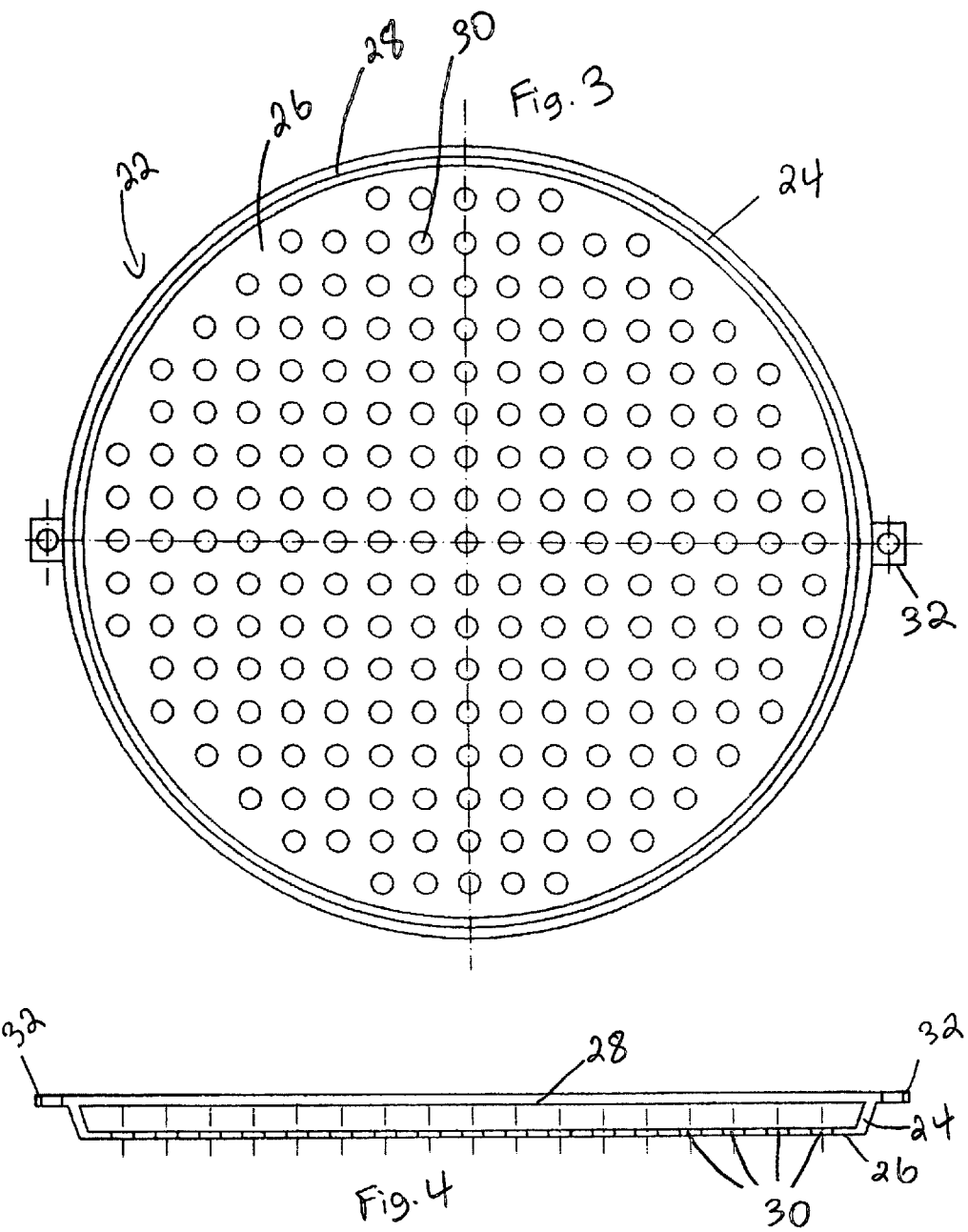

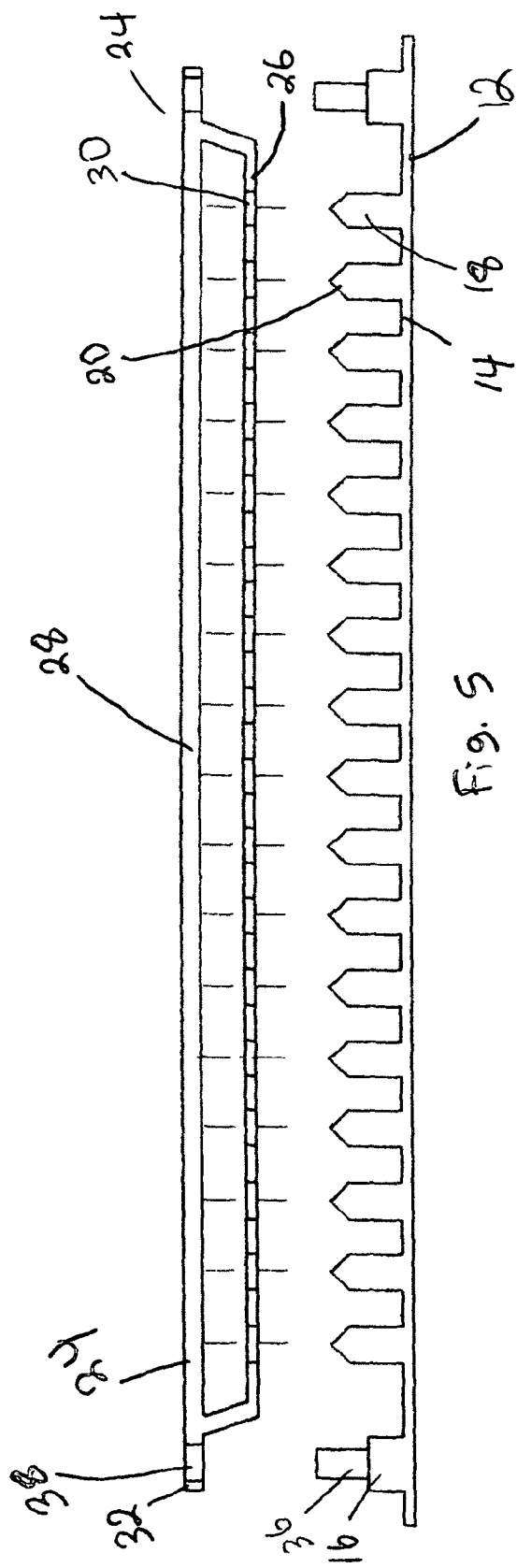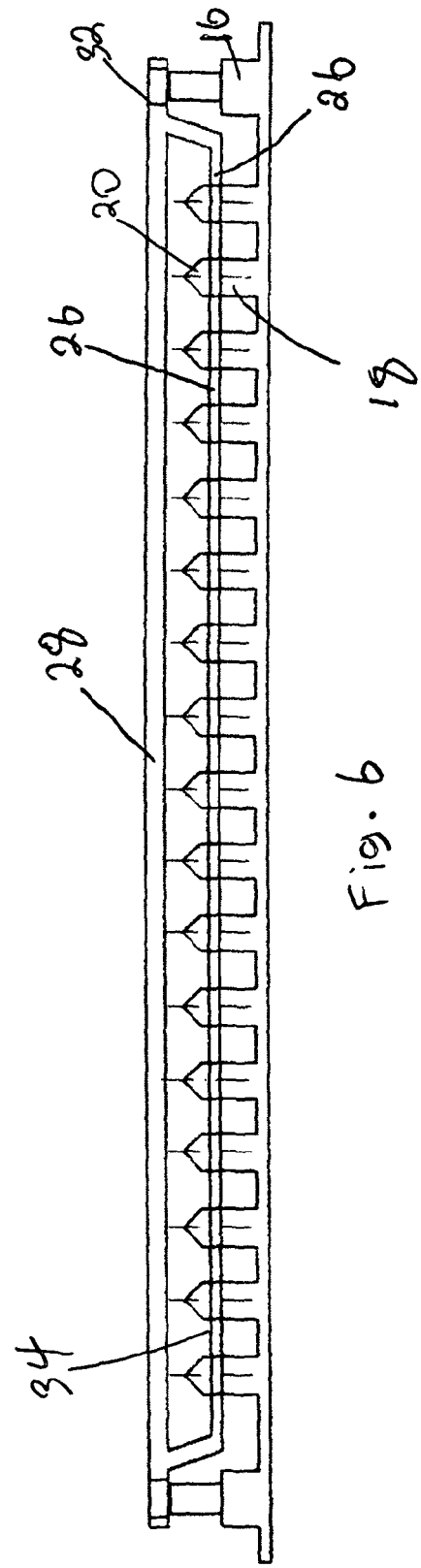

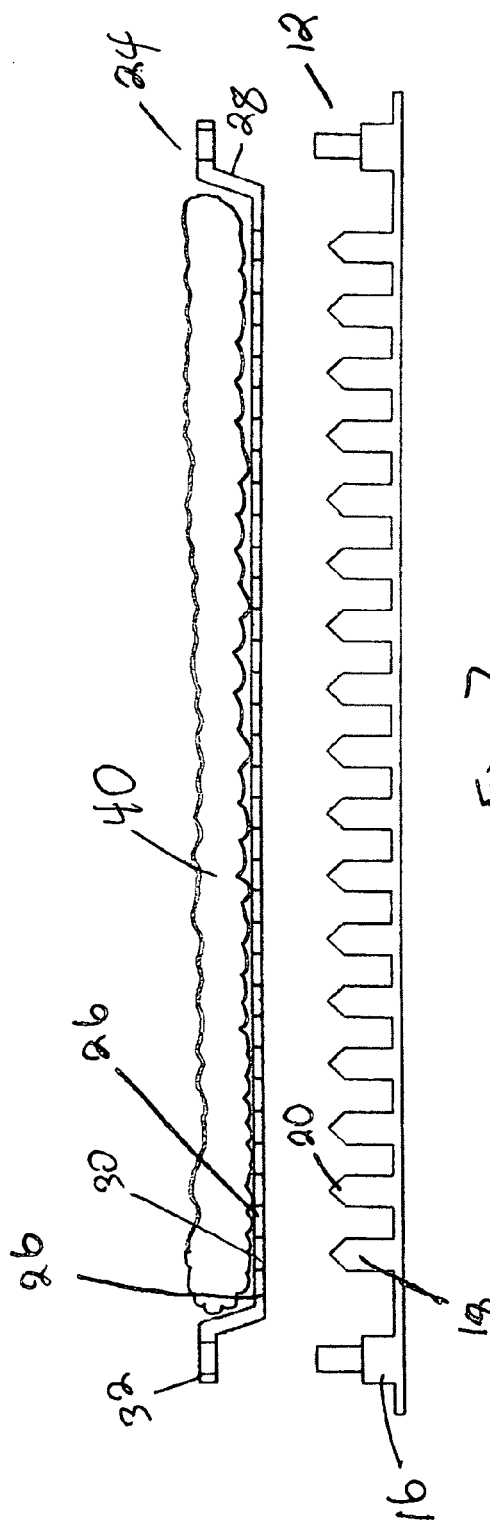
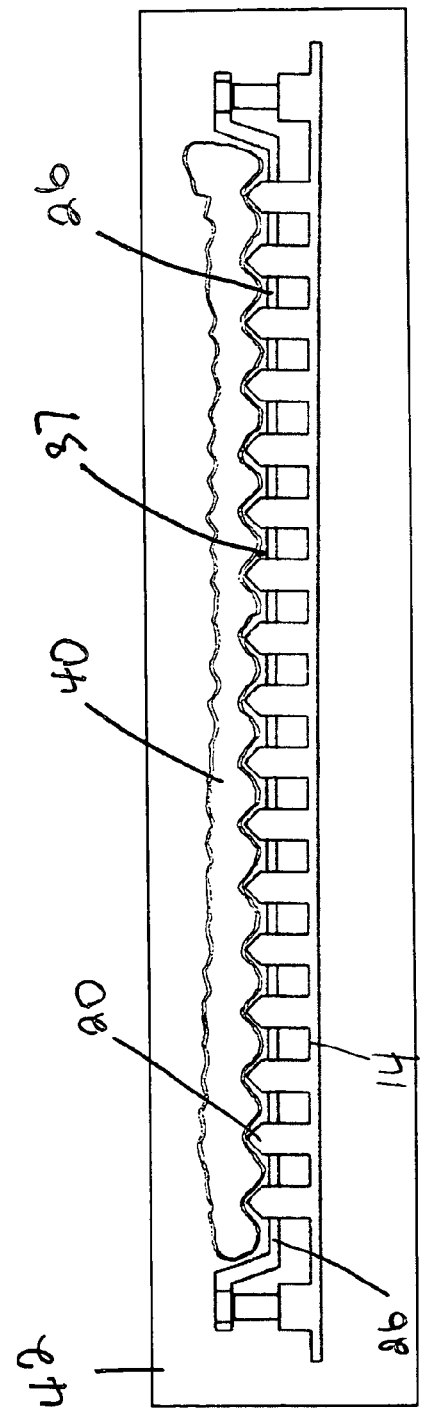

PIZZA PAN AND METHOD OF USING SAME

FIELD OF THE INVENTION

The invention relates generally to pans for cooking pizza dough.

BACKGROUND OF THE INVENTION

Pizza is a popular food which is commonly prepared and sold in pizza restaurants. Many of these pizza restaurants are engaged in preparing and selling the pizzas for delivery to the consumer. As can be appreciated, consumers wish the pizza which they order to be delivered as quickly as possible. Unfortunately, preparing and cooking a pizza can take a fair bit of time. Traditionally, preparing a pizza required the cook to first take a portion of prepared pizza dough and fashion the dough to fit in a flat circular pizza pan. After placing the dough in the pan, the dough was then dressed with pizza toppings as requested by the consumer. The dressed pizza dough was then placed in a heated pizza oven and left until the pizza dough was sufficiently cooked. After cooking, the pizza was removed from the pizza pans and then placed in a delivery box for delivery to the customer. The rate limiting step in the entire process with the cooking of the pizza dough since the fashioning and dressing of the pizza dough generally require little time. Speeding up the cooking of the pizza dough by adjusting the temperature of the oven is generally not advisable since it may lead to uneven cooking of the dough and an inferior finished product. Setting the oven temperature higher usually has the result of overcooking or burning the bottom portion of the pizza dough while leaving the top portion of the dough just below the toppings uncooked. As a result, an improved method of cooking pizza dough which allows for the quicker cooking of the dough without resulting in uneven cooking is desired.

SUMMARY OF THE INVENTION

It is an object of the present invention to provide an improved pan for cooking pizza dough. The improved pan consists of a first pan mountable below a second pan. The first pan has a flat bottom and a plurality of fingers projecting upwards from the bottom. The second pan having a flat bottom provided with a plurality of apertures dimensioned and configured to receive the fingers of the first pan. The first and second pans have mounting elements for releasably mounting the second pan on top of the first pan. The apertures of the second pan and the fingers of the first pan are dimensioned and arranged such that the fingers of the first pan project through the apertures of the second pan when the second pan is mounted on top of the first pan.

It is another object of the present invention to provide an improved method of cooking pizza dough using the pans of the present invention. The pans can be used to cook pizza dough by first spreading the pizza dough into the second pan and then mounting the second pan to the first pan such that the fingers of the first pan project through the apertures of the second pan and into the pizza dough. The pizza dough can then be cooked by placing the pans and pizza dough in a heated oven.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 1. is a top view of the first pan made in accordance with the invention.

FIG. 2. is a cross sectional view of the first pan shown in FIG. 1.

FIG. 3. is a top view of the second pan made in accordance with the present invention.

FIG. 4. is a cross sectional view of the second pan shown in FIG. 2.

FIG. 5. is a side view of the second pan suspended above the first pan.

FIG. 6. is a side view of the second pan mounted on top of the first pan.

FIG. 7. is a side view of a portion of pizza dough being placed in the second pan.

FIG. 8. is a side view of the pizza dough containing second shown in FIG. 7 being mounted to the first pan and then placed in a heated oven.

In the drawings like characters of reference indicate corresponding parts in the different figures.

DETAILED DESCRIPTION OF THE INVENTION

The present invention is a two part pizza pan for cooking pizza dough. The pan consists of a bottom pan (first pan) and an upper pan (second pan). The upper pan is mounted to the lower pan to form a single cooking pan. Referring firstly to FIGS. 1 and 2, the lower pan (first pan), shown generally as item 10, consists of a circular flat pan 12 made of a heat conducting metal such as steel, aluminum, iron or copper. Pan 12 has a flat bottom 14, mounting elements 16 and a plurality of projecting fingers 18 projecting upwards from flat bottom 14. Fingers 18 project vertically upward from bottom 14 and have pointed tips 20. Fingers 18 may be a series of indentations stamped into bottom 14. Alternately, fingers 18 may be a series of projections mounted to bottom 14 by means known generally in the art. Regardless of how fingers 18 are formed, the fingers are made of a heat conducting metal similar to bottom 14. Fingers 18 may be solid metal, but preferably, fingers 18 are hollow. Preferably, bottom portion 14 is uniformly covered with fingers 18 such that a substantial portion of the surface area of pan 12 is covered by fingers 18. The total area of the pan covered by fingers will vary depending on the quality of the cooked pizza dough required and the speed at which the pizza dough is to be cooked. For example, it has been discovered that if the surface area of the pan which is covered by fingers is approximately at least 25%, then a good quality pizza product results.

Referring now to FIGS. 3 and 4, upper pan 22 consists of a flat metal pan 24 having rim 28 and flat bottom 26. Pan 24 is made of a heat conducting material such as iron, steel, aluminum, copper or some other suitable material. Flat bottom 26 is provided with a plurality of apertures 30 uniformly spread across the flat bottom. Rim 28 is dimensioned to retain pizza dough (see FIG. 7) and apertures 30 are dimensioned and configured to receive fingers 18 from the bottom pan (see FIGS. 1 and 2). Mounting elements 32 are provided on pan 24.

As best seen in FIGS. 5 and 6, fingers 18 of first pan 12 and apertures 30 of second pan 24 are dimensioned such that fingers 18 will pass through apertures 30 when the second pan is mounted onto the first pan as shown in FIG. 6. Fingers 18 and apertures 30 are positioned such that the fingers and apertures are aligned when the two pans are mounted to each other. Mounting elements 16 and 32 are dimensioned and configured to ensure that fingers 18 align with apertures 30.

Mounting elements may comprise post 36 on bottom pan 12 and retainer 38 on upper pan 24 which is dimensioned to receive post 36; however, many suitable mounting elements may be used. It is possible to configure the mounting elements to permit several sets of upper and lower pans to be stacked one on top of the other for situations where several pizza's need to be baked in the same oven simultaneously.

When the two pans are mounted to each other as shown in FIG. 6, a unitary construction is created having bottom 34. Bottom 34 is highly convoluted because of the presence of finger tips 20 which project through the bottom. As a result, the surface area of bottom 34 is very high. This unitary pan is used to retain and cook pizza dough.

The use of the pan for cooking pizza dough will now be discussed with reference to FIGS. 7 and 8. A quantity of pizza dough 40 is first formed into a circular flat shape dimensioned to fit within upper pan 24. Dough 40 will cover bottom portion 26 of the pan, including apertures 30. Upper pan 24 is then mounted to lower pan 12 by aligning mounting elements 16 and 32. As the two pans are mounted to each other, fingers 18 project through apertures 30 such that finger tips 20 project into pizza dough 40. Pizza dough 40 is urged into upper pan 24 to ensure that the pizza dough is perforated by fingers 18. Preferably, dough 40 is dimensioned such that finger tips 20 do not perforate completely through the dough and remain contained in the dough. Preferably, dough 40 is suspended on finger tips 20 such that the dough is suspended slightly above flat bottom 26 of the upper pan 22 and separated from the flat bottom by space 37. The pizza dough may then be dressed with what ever pizza topping is desired, such as sauce, cheese and the like. The pans containing the dressed pizza dough are then inserted into heated oven 42 which is heated to a temperature suitable for cooking the pizza dough. Since both the upper and lower pans are made of a highly conductive material, heat from the oven is absorbed by the pans and transferred to the pizza dough. Fingers 18 greatly increase the surface area of pizza dough which is in contact to the heated metal pan. Since a greater surface area of dough is exposed to the metal pan, the pizza dough cooks much quicker. The greater the surface area of bottom 26 which has fingers 18 projecting through, the faster the pizza dough will cook. It has been discovered that if approximately between 25% to 50% of the surface area of bottom 14 is covered by fingers 18, the pizza dough will cook in approximately half the time (as compared to pizza dough cooked in a standard flat bottomed pan). As the pizza dough cooks, it expands into space 37 so that the dough eventually makes contact with flat bottom 26 during the cooking process.

When the pizza dough is fully cooked, the pans may be removed from oven 42 to cool. Removing the pizza from the pans is very simple, and involves lifting the upper pan from the lower pan. Since the cooked pizza dough is supported by upper pan 24, the cooked pizza dough may be separated from the pans without the dough sticking to fingers 18. A two pan construction is required for easy pizza removal. If the upper pan was done away with and the dough cooked on the lower pan, then it would be almost impossible to remove the pizza from the pan. The upper pan facilitates easy removal of the cooked pizza.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A method of cooking pizza comprising the following steps:
   a) providing a pizza pan for cooking pizza dough, said pizza pan comprising a first pan having a flat bottom and a plurality of fingers projecting upwards from the bottom, and a second pan having a flat bottom, the first and second pans having mounting elements for releasably mounting the second pan on top of the first pan, the flat bottom of the second pan having a plurality of apertures, the apertures of the second pan and the fingers of the first pan being dimensioned and configured such that the fingers of the first pan project through the apertures of the second pan when the second pan is mounted on top of the first pan;
   b) the pizza dough being first placed in the second pan such that the pizza dough substantially covers the entire flat bottom of the second pan,
   c) the second pan being then mounted to the first pan such that the fingers of the first pan project through the apertures of the second pan and towards the pizza dough,
   d) the pizza dough then being topped with pizza toppings,
   e) the topped pizza dough then being cooked by placing the pans in an oven until the pizza dough is sufficiently cooked.

2. The method of claim 1 further comprising the step of removing the cooked pizza from the pans by first separating the second pan from the first pan and then removing the cooked pizza from the second pan.

3. The method of cooking pizza as defined in claim 1 further comprising the step of urging the pizza dough into the second pan with sufficient force such that the fingers of the first pan projecting through the apertures of the second pan penetrate the pizza dough before the pizza dough is cooked.

4. The method of cooking pizza as defined in claim 3 wherein the pizza dough is urged into the second pan such that the fingers do not penetrate all the way through the pizza dough.

* * * * *